US007001610B2

(12) United States Patent
Stewart

(10) Patent No.: US 7,001,610 B2
(45) Date of Patent: *Feb. 21, 2006

(54) FOOD SUPPLEMENT AND USE THEREOF FOR ELEVATING LEVELS OF ESSENTIAL FATTY ACIDS IN LIVESTOCK AND PRODUCTS THEREFROM

(75) Inventor: James F. Stewart, Kitchener (CA)

(73) Assignee: Omeganutrel Inc., (CA)

( * ) Notice: Subject to any disclaimer, the term of this patent is extended or adjusted under 35 U.S.C. 154(b) by 19 days.

This patent is subject to a terminal disclaimer.

(21) Appl. No.: 10/278,061

(22) Filed: Oct. 22, 2002

(65) Prior Publication Data

US 2003/0198730 A1 Oct. 23, 2003

Related U.S. Application Data

(63) Continuation-in-part of application No. PCT/CA02/00566, filed on Apr. 23, 2002.

(60) Provisional application No. 60/285,240, filed on Apr. 23, 2001.

(51) Int. Cl.
*A23K 1/10* (2006.01)

(52) U.S. Cl. ............... 424/438; 424/442; 424/523; 424/724; 424/768; 426/2; 426/53; 426/643; 426/805; 426/807; 514/560

(58) Field of Classification Search ............ 514/560; 424/768, 724, 442, 438, 523; 426/2, 53, 426/805, 807, 643
See application file for complete search history.

(56) References Cited

U.S. PATENT DOCUMENTS

| | | | |
|---|---|---|---|
| 3,271,161 A | | 9/1966 | Eshleman |
| 3,901,976 A | * | 8/1975 | Roth et al. .................. 426/69 |
| 4,911,944 A | | 3/1990 | Holub |
| 5,290,573 A | | 3/1994 | Holub |
| 5,932,257 A | | 8/1999 | Wright et al. |
| 5,985,348 A | | 11/1999 | Barclay |
| 2004/0202769 A1 | * | 10/2004 | Stewart .................. 426/601 |

FOREIGN PATENT DOCUMENTS

| | | |
|---|---|---|
| CA | 2147432 | 10/1995 |
| CA | 2324686 | 5/2002 |
| DE | 4327310 | 2/1994 |
| EP | 0047142 | 3/1982 |
| FR | 2213740 | 8/1993 |
| FR | 2745979 | 11/1997 |
| WO | WO 97/49297 | 12/1997 |
| WO | 02/085133 | 10/2002 |
| WO | 03/003854 | 1/2003 |

OTHER PUBLICATIONS

Martindale—Codliver Oil pp 1951, 1982—1974.*
Abstract—Database WPI Section Ch, Week 199421 Derwent Publications Ltd., London, GB; AN 1994-175119 XP002271903 & SU 1 803 023 A1 (DNEPR Elita Res Prodn Assoc) (Mar. 23, 1993).
Abstract—Database WPI Section Ch, Week 199413 Derwent Publications Ltd., London, GB; AN 1994-107920 XP002271904 & SU 1 790 900 A1 (Kaidalov A F) (Jan. 30, 1993).

* cited by examiner

*Primary Examiner*—Neil S. Levy
(74) *Attorney, Agent, or Firm*—Thompson Hine LLP

(57) ABSTRACT

This invention describes feed supplement, and processes which increase the amount of essential fatty acids in the milk, eggs, meat and other by-products from animals including dairy cattle, beef cattle, goats and poultry. The food supplement described herein includes specific fish meal, fish oil, algae or plant dietary supplements combined with a natural ingredient/coating mixture, which can be either talc, clay or combinations; or mixtures of talc or clay with flax sprout powder to achieve enhanced levels of the essential fatty acids in the milk, eggs, meat and processed livestock products from animals fed this dietary supplement. In ruminants, the natural ingredient/coating mixture prevents microbial degradation of the essential fatty acids in the rumen stomach of the animals fed with this composition, thus providing more of the essential fatty acids to the animal, for their use. This in turn results in improved concentrations in the milk, meat and processed products from these animals. Poultry fed with this food supplement also have a higher concentration of essential fatty acids in their eggs and meat.

8 Claims, No Drawings

FOOD SUPPLEMENT AND USE THEREOF FOR ELEVATING LEVELS OF ESSENTIAL FATTY ACIDS IN LIVESTOCK AND PRODUCTS THEREFROM

This application is a continuation-in-part of PCT application CA02/00566 filed Apr. 23, 2002 claiming priority to U.S. Provisional Application No. 60/285,240 filed Apr. 23, 2001.

FIELD OF THE INVENTION

This invention relates to a feed supplement, and processes which increase the amount of essential fatty acids in the milk, eggs, meat and other by-products from animals including dairy cattle, beef cattle, goats and poultry. In particular, the present invention relates to a feed supplement, which includes a natural ingredient that acts as a rumen bypass ingredient, which protects the fatty acids from being broken down in the rumen so that the ruminant can receive the beneficial effects of the feed or food supplement formulations.

BACKGROUND OF THE INVENTION

Essential fatty acids (EFAs) cannot be manufactured by animals including humans and are required in human nutrition. There are two groups of essential fatty acids, omega-3 fatty acids and omega-6 fatty acids. Omega-3 fatty acids are found naturally in the oil of cold-water fish, such as mackerel, salmon, sardines, anchovies and tuna, or as extracted oil from plants, such as flaxseed, canola (rapeseed), or soybean. Examples of omega-3 fatty acids include docosahexaenoic acid (DHA), eicosapentenoic acid (EPA) and alpha linolenic acid. Omega-6 fatty acids are found in both animal and plant material. Plant sources include unprocessed, unheated vegetable oils such as corn, sunflower seed, safflower, soy, sesame, and cottonseed oils. They are also found in plant materials such as evening primrose, black current seeds and gooseberry oils as well as in raw nuts and seeds, legumes and leafy greens. Omega-6 fatty acids include linoleic acid and its derivatives, such as arachidonic acid (AA). There are also conjugated fatty acids such as conjugated linolenic acid (CLA).

Omega-3 fatty acids are linked to a wide variety of beneficial health effects in documented intervention studies as essential constituents of cells, especially brain cells, nerve cells, retina, adrenal glands, and reproductive cells. Long chain omega-3 polyunsaturates (PUFA's) such as DHA/EPA are thought to have health benefits for the heart, skin, immune system and help regulate inflammatory diseases, attention deficit disorders and infant development. There are also a number of new studies underway that suggest benefits in preventing Alzheimers', dementia, and colorectal cancers.

There have been a number of patents granted outlining the benefits from specific omega fatty acids present in food and/or supplements. Several patents have also been granted for the enrichment of foods that are normally low or deficient in omega 3/6 and PUFA's. For example, U.S. Pat. No. 5,932,257 (Wright et al.) relates to DHA being produced in cow's milk through the feeding of cold-water fish meal to cows, using a feather meal based feed supplement. The feather meal used according to this prior art reference is used as an inhibitor of microbial degradation of DHA in the rumen of the dairy cattle. U.S. Pat. Nos. 4,911,944 and 5,290,573 also disclose the use of feed supplements containing fish meal combined with animal by-products eg. feather meal, bone meal and the like. A number of patents have also been granted for the elevation of omega-3 in eggs using flax meal or algae/DHA feed supplements in chickens.

A ruminant is an animal which possesses a complex stomach consisting of four morphologically distinct compartments. These compartments are rumen, reticulum, omasum and abomasum. The former two are derived from the terminal portion of the esophagus, and only the latter two are considered to be a genuine stomach. After passing through the first two compartments, the food is returned to the mouth. The rumen and the reticulum are fermentation compartments wherein *Ophryoscolex Diplodinium* and *Plectridium cellulolyticum* are commensal, and the digestion of the feed (vegetable tissues) is conducted by cellulase, amylase, or cellobiose secreted by these microorganisms (digestive symbiosis).

In ruminant animals such as cattle or sheep, there is a problem that occurs when a biologically active substance is, for instance, orally administered. Part of the substance may be decomposed by microorganisms in the rumen producing products such as ammonia or carbon dioxide gas. This partial decomposition makes it difficult or impossible for the animal to effectively utilize all of the administered proteins, amino acids or fatty acids contained in the active substance. Thus, a ruminant only receives the benefit of a portion of the nutrients fed to it and loses a portion for the support and formation of rumen microorganisms. While the nutrients contained in feed clearly contribute to the ruminant's sustenance, another source of nutrition for ruminants is the protein derived from those microorganisms in the rumen which are passed to the lower stomachs. Accordingly, it is important to maintain the microorganism population in the rumen in order to provide a constant source of this protein.

When special nutrients or drugs which must be absorbed or metabolized are administered to ruminants it is important to protect these substances from the environmental conditions of the first stomach: i.e., from the decomposition by microorganisms and from the influence of weakly acidic or weakly alkaline pH, so that the substance can be maintained intact until it reaches the intended digestive or absorptive site. Namely, it is desirable that certain nutrients and drugs pass through the rumen to the omasum without being affected by microorganisms, with digestion being conducted in the abomasum and the digested feed being absorbed by the small intestine. As noted above with U.S. Pat. No. 5,932,257, this was accomplished in part by including feathermeal as an inhibitor of microbial degradation of DHA within the composition. However, as noted above, this approach is not preferred, as the ruminant microorganisms are important and must be maintained. Other methods of protecting active components from degradation in the rumen have been described, e.g., in Canadian Patent application 2,147,432, which describes the use of hardened animal and plant oils and fats and fatty acid esters to protect the active ingredient. There are problems, however, encountered with this method, as it is often necessary to include within the active ingredient other special ingredients which will assist in the degradation of the ruminant bypass product, once the product has passed into the second and third stomachs for digestion. Thus, there is a need for a ruminant bypass ingredient which will assist in protecting essential fatty acids from attack by the microorganisms in the ruminant so that these fatty acids are available for use by the animal, once they have passed into the third and fourth stomaches of the ruminant complex stomach system.

Patents have also been granted for the elevation of omega-3 in eggs using flax meal or algae/DHA feed supplements in chickens. Flax in the case of most livestock feeds also acts as a laxative and can be a feeding deterrent. While flax seed is an excellent source of alpha linolenic acid, i.e. in the order of 15 g/100 g, whole flax seed passes through the body almost entirely unconverted; ground flax seed on the other hand rapidly losses its alpha linolenic acid content and does not store well in terms of linolenic acid content. In terms of algae (DHA fermented concentrates), these feed and food mixes are produced via genetic recombination technology, which has limited consumer favour in most markets.

Prior art feed formulas have a number of deficiencies on a practical basis. For example, fish meal/feather meal feed supplements are very unpalatable and can be a feeding deterrent to livestock such as cows, and only limited amounts of DHA can be achieved in the milk. Also, the use of animal by-products, i.e., blood meal/feather meal, have been banned in most countries to prevent the spread of infectious diseases. Moreover, obtaining elevated levels of beneficial compounds such as omega 3 fatty acids in meat or livestock by-products (milk, and milk processed products such as cheese, cream and the like), has been difficult to achieve. As noted above, this may be due to stomach physiology of livestock animals. For example, the rumen in dairy cows, breaks down long chain polyunsaturates eg. DHA/EPA, thereby preventing the elevation of natural sources/PUFA's in livestock, livestock by-products (eg. milk) or processed fractions. Thus, there is also a need to provide a food supplement that addresses the flavour and stability problems of prior art supplements.

It has also been documented that many food products for example, whole milk, and processed dairy products, meats, etc. contain omega 3/6's ratios of 1:5 or higher. Most scientific data and the views of health experts including nutritionists suggest that the lower the total omega 6 value relative to the omega 3 value, the greater the health benefits associated with the food. North American diets in particular have been widely documented as having higher (less healthy) omega 6 (polysaturated fatty acids) vs. omega 3 polyunsaturated fatty acids. Omega 3/6 ratios above 1:7 are of particular concern and may contribute to heart disease, circular disorders, and other health problems.

It has been suggested that consumption of certain grasses by livestock may enhance the total amount of omega-3 fatty acids found in milk and processed by-products versus the amount of omega-3 fatty acids found in conventional livestock fed silage feeds. However, relatively high levels of omega-3 fatty acids, usually in the form of alpha linolenic acid usually results in relatively low levels of DHA/EPA in milk. This is believed due to the low conversion rate of plant based (sourced) omega-3 fatty acids, for example alpha linolenic acid (ALA) into DHA/EPA.

There is a need in the art for feed supplements capable of elevating the amount of omega-3 fatty acids in milk and/or other animal by-products such as meat, etc. There is also a need in the art for feed supplements that are capable of protecting omega-3 containing plant based material from being prematurely digested before reaching the proper absorptive site of the digestive tract of an animal. Further, there is a need in the art for feeds and feed supplements that act synergistically to complement the total amount of DHA/EPA being converted or absorbed from the plants into the animal relative to other fatty acids such as omega-6 fatty acids.

The present invention overcomes drawbacks in the prior art. The drawbacks are overcome by a combination of the features of the main claims. The sub-claims disclose further advantageous embodiments of the invention and may also overcome drawbacks in the prior art.

SUMMARY OF THE INVENTION

This invention relates to a feed supplement, and processes which increase the amount of essential fatty acids in the milk, eggs, meat and other by-products from animals including dairy cattle, beef cattle, goats and poultry. In particular, the present invention relates to a feed supplement, which includes a natural ingredient that acts as a rumen bypass ingredient, which protects the fatty acids from being broken down in the rumen so that the ruminant can receive the beneficial effects of the feed or food supplement formulations. This natural ingredient in a feed supplement results in a higher concentration of essential fatty acids in the eggs and meat from poultry fed this feed supplement.

The present invention provides a feed/food supplement capable of elevating beneficial components such as omega-3 fatty acids in livestock, and other animals while lowering omega-6 fatty acids. The present invention provides animal products such as, but not limited to milk, meat, eggs and other livestock by-products as food, processed food products supplements, and ingredients whereby these new feed and food products and uses result in elevated amounts of beneficial omega-3 fatty acids, long chain polyunsaturates, nutraceuticals such as DHA/EPA that have subsequent health processing and livestock husbandry benefits by lowering the levels of omega-6 fatty acids.

In an aspect of an embodiment, the uniqueness of the invention may comprise the combination or known feeding dietary supplements containing cold-water fish meal and/or oil/plant/algae combined with the use of a natural ingredient/coating mix in a diet and feeding regime which results in elevated levels of beneficial omega fatty acids in the milk, meat, eggs and processed food products. The omega-3 and LPC components of the supplement may remain the same with only certain components varying in terms of dietary and taste needs for livestock.

Thus, according to the present invention, there is provided a feed additive for livestock comprising:
a) essential fatty acids; and
b) a natural ingredient selected from the group consisting of talc and clay wherein said natural ingredient is present in the feed in an amount sufficient to increase the concentration of the essential fatty acids in the milk, eggs or meat of the animal fed with the feed additive over a period of time.

In a further embodiment, there is also provided a method of producing milk, eggs or meat of an animal which is enriched for essential fatty acids, comprising feeding an animal a feed additive as defined herein in an amount sufficient to enhance the concentration of essential fatty acids in the milk, eggs or meat and collecting the milk, eggs or meat from the animal.

Also included in this invention is enriched milk and milk products produced from animals fed with the feed additive of the present invention.

The present invention also provides a feed or feed supplement which is capable of increasing the total amount of essential polyunsaturated fatty acids in milk and providing improved ratios of total omega 3 fatty acids to omega 6 fatty acids versus what can be achieved for ruminants or other animals eating equivalent omega 3 sources of plant material only, for example, mainly grasses in a ruminant's diet or dairy cows (ruminants) fed conventional corn/soy/hay silage mixtures. Further, the present invention may provide for increased amounts of the essential fatty acids DHA/EPA in the milk of dairy cows fed grass plus an omega-3 feed supplement versus cows fed only grass or plant materials or dairy cows fed only conventional corn/soy/hay silage without an omega 3 feed supplement.

In an embodiment of the present invention, which is not meant to be limiting in any manner, the present invention relates to the feed and feed supplements as defined above and further comprising an omega 3 plant source diet (e.g. grasses) which include natural ingredients that act as a rumen by pass ingredient, protecting the ingested fatty acids from being broken down in the rumen so that the ruminant can receive the beneficial effects of the feed or food supplement formulations.

Moreover, the feed supplement of the present invention which is relatively rich in DHA/EPA may also act synergistically to complement the conversion of DHA/EPA from plants (e.g. grasses and other plant sources such as brassica plant species, flax, and the like) based sources of omega 3's such alpha linolenic acid and or other precursors into DHA/EPA and total omega 3's. The resulting effect is to have a complementary amounts of DHA/EPA formed in milk and/or animal by-products which in turn result in larger amounts of omega 3 (DHA/EPA) enriched processed dairy and or livestock products. The complementary conversion of plant and fish based DHA/EPA also results in more beneficial ratios of total omega 3's to omega 6's i.e. in the order to 1:1 to 1:5 versus higher unfavorable ratios of 1:6 or higher.

In an embodiment of the invention, an aspect of the invention may be the combination of known benefits of a livestock (ruminant) feed/food supplement comprised of essential cold water fish meal and/or plant sourced alpha linolenic acid (ALA) from ground or dried sprouted flax or ALA plant source/algae/components combined with the use of natural coating materials plus a diet and plant source (grasses) feeding regime which results in greater amounts of DHA/EPA over what would be present in milk and or the animal (for example, but not limited to ruminant) by-products feeding only on plant e.g. grass sourced omega 3's.

Thus, according to the present invention, there is provided a feed additive for livestock comprising:
  a) essential fatty acids;
  b) a natural ingredient comprising, but not limited to talc, clay or mixtures thereof in combination with an omega 3 source derived from algae, plant, such as but not limited to ground flax, dried sprouted flax or the like, and;
  c) a plant food source containing omega-3 fatty acids.

The plant food source may be obtained during the normal course of an animal's grazing or it may be fed to an animal, preferably in natural plant form. Thus, in an aspect of an embodiment the plant food source may comprise grasses. In a further aspect, the omega-3 fatty acids in the plant food source may comprise alpha linolenic acid. In still another aspect of an embodiment, the plant food source may comprise flax, alone or in combination with other omega-3 fatty acid sources, as described herein. Preferably, the natural ingredient and other components are as described above, and are present in the feed in an amount to result in a digestive process that increases the concentration of essential fatty acids (DHA/EPA) in the milk, and livestock by-products of the animals fed with the feed additive over a period of time.

The present invention also contemplates a feed or feed supplement wherein the omega 3 plant or algal source is mixed with natural ingredients such as, but not limited to clay, talc or combination thereof to form a stabilized/concentrated form of omega 3, for example, but not limited to as ALA (alpha linolenic acid). For example, but not wishing to be limiting, dried sprouted flax seed or other dried sprouted seed material rich in ALA or DHA/EPA may be employed.

The invention also pertains to a method of producing milk, or livestock by-products of an animal which is enriched for essential fatty acids. The method comprises feeding an animal a feed additive as defined herein in a sufficient amount to enhance the concentration of essential fatty acids in the milk, or processed by-products, and isolating the milk or livestock by-product. Also according to the present invention, there is provided meat and meat products produced from animals fed with the feed additive of the present invention.

Thus, according to the present invention there is provided a livestock feed comprising:
  a) a feed supplement enriched with one or more essential fatty acids;
  b) a natural ingredient capable of acting as a rumen by-pass ingredient, and;
  c) a plant food source comprising omega-3 fatty acids.

Preferably, the one or more essential fatty acids comprise omega-3 fatty acids. More preferably, the essential fatty acids comprise docasahexaenoic acid (DHA), eicosapentenoic acid (EPA), linoleic acid, alpha-linolenic acid (ALA), conjugates of linolenic acid (CLA) or precursors to DHA/EPA.

The natural ingredient (coating material) preferably acts as a rumen by-pass ingredient in such animals. In embodiments of the present invention, which are not meant to be limiting in any manner, the natural ingredient comprises talc, clay or a mixture thereof. The natural ingredient may also be premixed with a concentrated omega-3 source, for example, but not limited to a plant source, algae source or a combination thereof. In an aspect of an embodiment, the plant source may comprise ground flax or dried sprouted flax.

The plant food source is typically a grazing food source, such as, but not limited to grasses or canola. Preferably, the plant food source comprises an omega-3 source. More preferably, the plant food source comprises an enriched omega-3 source compared to normal grasses in the population.

Also contemplated by the present invention as defined above, the feed supplement may be derived from fish, algae, plants, or a combination thereof as described herein.

Also contemplated by the present invention as defined herein, the feed is preferably rich in fibre and may optionally include a flavouring agent to increase the taste and palatability of the feed.

Also provided by the present invention is the use of the feed as defined above as a supplement for an animal. Further, the present invention also provides a method of increasing the total concentration of DHA and EPA in an animal or animal product comprising feeding the feed as defined above to an animal. In an alternate embodiment there is provided a method of increasing the ratio of omega-3 fatty acids to omega-6 fatty acids in an animal or animal product comprising feeding the feed as defined above to the animal.

The animal product may comprise any animal product known in the art. For instance, but not wishing to be limiting, the animal product may comprise a dairy product selected from the group consisting of milk, cheese, cream, ice-cream, buttermilk, eggnog, flavoured milk beverages, butter, cheese curd, sour cream, whey, yogurt, milk powders, casein, or a combination thereof. However, other animal processed and non-processed products are also contemplated as are animals themselves.

Also provided by the present invention is a method of maintaining or enhancing the health of livestock, comprising feeding the feed or feed additive as defined above to an animal or livestock. Observable effects of the method may include, but are not limited to the production of healthier cows or calves, less teat infections, shorter dry periods, increased life span, or a combination thereof.

This summary of the invention does not necessarily describe all necessary features of the invention, but that the invention may also reside in a sub-combination of the described features.

DETAILED DESCRIPTION OF THE INVENTION

This invention relates to a feed supplement, and processes which increase the amount of essential fatty acids in the milk, eggs, meat and other by-products from animals including dairy cattle, beef cattle, goats and poultry. In particular, the present invention relates to a feed supplement, which includes a natural ingredient that acts as a rumen bypass ingredient, which protects the fatty acids from being broken down in the rumen so that the ruminant can receive the beneficial effects of the feed or food supplement formulations.

According to the present invention, there is provided a method of elevating beneficial components such as omega 3 fatty acids in livestock and other animals. This results in elevated levels of omega 3 fatty acids in the animal's milk, meat, eggs and other livestock by-products used as food, processed food products, supplements and ingredients. According to the present invention, the term "omega fatty acids" is meant to include omega-3 (or N-3) fatty acids, polysaturated fatty acids and/or omega-6 saturated fatty acids, such as docosahexaenoic acid (DHA), eicosapentaenoic acid (EPA), or precursors such as alphalinolenic acid (ALA), and linoleic acid and its derivates such as gamma linoleic acid (GLA) or conjugates such as conjugated linolenic acid and other beneficial fatty acids.

The omega fatty acids, which are in the feed additive, may be in concentrate form, comprising about 5 to about 98% omega fatty acids, or it may be a component of an extract from a source known to contain the omega fatty acids. For example, it may be a component of an extract derived from fish, such as fish meal, flax, algae and the like. Some of these sources of omega fatty acids are commercially available and may be combined with other nutrients known in the art. According to the present invention, a natural ingredient of either clay or talc, or a mixture thereof, is fed to the animal in combination with the omega fatty acid dietary supplement. Without wishing to be bound by theory, the talc or clay material may coat the inner lining of the rumen to allow the omega fatty acid feed supplement to pass through the rumen with little or no microbial degradation, thus allowing the full benefit of the feed to be utilized by the animal. It has also been suggested that the natural ingredient may act as an anti acid in the stomach of livestock. This in particular may be a reason why the feed additive of the present invention is beneficial to chickens and results in an increased concentration of essential fatty acids in the resulting eggs and meat. While not being rumens, chickens have been found to benefit from the feed additive of the present invention, and thus the feed additive of the present invention may be employed in a variety of animals such as, but not limited to dairy cattle, beef cattle, pigs, horses, ducks, geese, chickens or any animal that may benefit from increased omega-3 fatty acids in meat or in products produced therefrom.

According to the present invention, the natural ingredient (coating material) comprising talc, clay or combination thereof may be selected from the group consisting of magnesium silicate hydroxide, sodium bentonite, a member from the kaolinite group, a member from the montmorillonite/smectite group, a member of the illite group, a member of the chlorite group, or a combination thereof. These groups are discussed in greater detail below.

The Kaolinite Group has three members (kaolinite, dickite and nacrite) and a formula of $Al_2Si_2O_5(OH)_4$. The different minerals are polymorphs, meaning that they have the same chemistry but different structures. The kaolinite group is composed of silicate sheets $(Si_2O_5)$ bonded to aluminum oxide/hydroxide layers $(Al_2(OH)_4)$ called gibbsite layers.

The silicate and gibbsite layers are tightly bonded together with only weak bonding existing between the s-g paired layers.

The Montmorillonite/Smectite Group is composed of several minerals including pyrophyllite, talc, vermiculite, sauconite, saponite, nontronite and montmorillonite. They differ mostly in chemical content. The general formula is $(Ca, Na, H)(Al, Mg, Fe, Zn)_2(Si, Al)_4O_{10}(OH)_2-xH_2O$, where x represents the variable amount of water that members of this group could contain. Talc's formula, for example, is:

$Mg_3Si_4O_{10}(OH)_2$. The gibbsite layers of the kaolinite group can be replaced in this group by a similar layer that is analogous to the oxide brucite, $(Mg_2(OH)_4)$. The structure of this group is composed of silicate layers sandwiching a gibbsite (or brucite) layer in between, in an s-g-s stacking sequence. The variable amounts of water molecules would lie between the s-g-s sandwiches.

The Illite (or the clay-mica) Group is basically a hydrated microscopic muscovite. The mineral illite is the only common mineral represented, however it is a significant rock forming mineral being a main component of shales and other argillaceous rocks. The general formula is $(K, H)Al_2(Si, Al)_4O_{10}(OH)_2-xH_2O$, where x represents the variable amount of water that this group could contain. The structure of this group is similar to the montmorillonite group with silicate layers sandwiching a gibbsite-like layer in between, in an s-g-s stacking sequence. The variable amounts of water molecules would lie between the s-g-s sandwiches as well as the potassium ions.

The Chlorite Group is not always considered a part of the clays and is sometimes left alone as a separate group within the phyllosilicates. It is a relatively large and common group although its members are not well known. These are some of the recognized members:

Amesite $(Mg, Fe)_4Al_4Si_2)_{10}(OH)_8$
Baileychlore $(Zn, Fe+2, Al, Mg)_6(Al, Si)_4O_{10}(O, OH)_8$
Chamosite $(Fe, Mg)_3Fe_3Al, Si_3O_{10}(OH)_8$
Clinochlore (kaemmererite) $(Fe, Mg)_3Fe_3AlSi_3O_{10}(OH)_8$
Cookeite $LiAl_5Si_3O_{10}(OH)_8$
Corundophilite $(Mg, Fe, Al)_6(Al, Si)_4O_{10}(OH)_8$
Daphnite $(Fe, Mg)_3(Fe, Al)_3(Al, Si)_4O_{10}(OH)_8$
Delessite $(Mg. Fe+2, Fe+3, Al)_6(Al, Si)_4O_{10}(O, OH)_8$
Gonyerite $(Mn, Mg)_5(Fe+3)_2Si_3O_{10}(OH)_8$
Nimite $(Ni, Mg, Fe, Al)_6AlSi_3O_{10}(OH)_8$
Odinite $(Al, Fe+2, Fe+3, Mg)_5(Al, Si)_4O_{10}(O, OH)_8$
Orthochamosite $(Fe+2, Mg, Fe+3)_5Al_2Si_3O_{10}(O\ OH)_8$
Penninite $(Mg, Fe, Al)_6(Al, Si)_4O_{10}(OH)_8$ Pannantite $(Mn, Al)_6(Al, Si)_4O_{10}(OH)_8$ Rhipidolite (prochlore) $(Mg, Fe, Al)_6(Al, Si)_4O_{10}(OH)_8$ Sudiote $(Mg, Fe, Al)_{4-5}(Al, Si)_4O_{10}(OH)_8$ Thuringite $(Fe+2, Fe+3, Mg)_6(Al, Si)_4O_{10}(O, OH)_8$ The term chlorite is used to denote any member of this group when differentiation between the different members is not possible. The general formula is $X_{4-6}Y_4O_{10}(OH,O)_8$. The X represents either aluminum, iron, lithium, magnesium, manganese, nickel, zinc or rarely chromium. The Y represents either aluminium, silicon, boron or iron but mostly aluminum and silicon.

According to the present invention, the natural ingredient of the present invention can be added in the barns to commercially available omega 3 feed supplements. In this embodiment, which is not meant to be limiting in any manner, about 100 to 300 grams of the natural ingredient/coating mix (3–8% w/w) is added to about 3 kg of omega fatty acid feed supplement, either as a top dressing or as part of the total mixed ration, fed per day for each cow or beef cattle. The total amount of feed fed per day will depend upon the size of the animal and the animal type.

Also, according to the present invention, the natural ingredient can be pre-mixed into the omega fatty acid feed supplement. In this embodiment an example of a omega fatty acid feed supplement, which is not to be construed as limiting, is as follows:

|  | Kg |
| --- | --- |
| Menhadden meal[1] | 150–300 |
| Herring meal | 150–300 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

[1] contains fish meal or oil from cold marine fish with a total DHA/EPA omega 3 and omega 6 content of the feed supplement being in the order of 400, 540, 600, 1000 mg/100 g respectively.

[2] contains 225 mg/g of EPA and 150 mg/g of DHA and 400 mg/g of omega 3 and 4 mg of omega 6's.

[3] contains 150 mg/g of omega 3 alpha linolenic acid or more

Omega 3/6 levels are the same as Menhadden and Herring meal.

| Barley | 150–250 |
| --- | --- |
| Soy hulls | 170–250 |
| HC plus Premix (specific mineral pre-mix) | 20–30 |
| Herring fish oil | 16–24 |
| Hiboot sale | 8–12 |
| Vitamin E | 4–6 |
| Mag Ox | 3.2–4.8 |
| Vitamin ADE | 1.6–2.4 |
| Apple flavour | 1.6–2.4 |

A natural ingredient (coating material) comprising magnesium silicate hydroxide (talc) and/or sodium bentonite, clay or combination thereof is added at a concentration of about 3 to 8% w/w to the omega 3 feed ingredients/diet (i.e. 30 to 80 kg/1000 of the above feed ingredients). However, amounts outside this range may also be employed if desired.

A typical test supplement which is not meant to be considered limiting in any manner comprises the following components on a % weight basis:

| Minimum Guaranteed Analysis (total mix) | | | |
| --- | --- | --- | --- |
| Crude Protein (min) | 38.2% | Zinc (actual) | 185 mg/kg |
| *ECP from NPS (max) | 0.0% | Manganese | 185 mg/kg |
| Crude Fat (min) | 6.1% | Copper (actual) | 75 mg/kg |
| Crude Fiber (max) | 11.0% | Iodine (actual) | 2.9 mg/kg |
| Calcium (min) | 3.3% | Iron (actual) | 500 mg/kg |
| Phosphorous (min) | 1.7% | Cobalt (actual) | 0.85 mg/kg |
| Sodium (actual) | 0.76% | Fluorine (max) | 100 mg/kg |
| Magnesium (actual) | 0.6% | Vitamin A (min) | 25,300 IU/kg |
| Potassium (actual) | 0.8% | Vitamin D3 (min) | 5,060 IU/kg |
| Sulfur (actual) | 0.29% | Vitamin E (min) | 400 IU/kg |
| Omega 3 | 35.80 g/kg | Omega 6 | 13.0 g/kg |
| EPA | 17.0 g/kg | DHA | 38 g/kg |

In a further embodiment of the present invention, when the omega 3 fatty acid dietary supplement is used in cattle, the supplement may be as follows:

|  | Kg. |
| --- | --- |
| Menhadden meal | 240 |
| Herring meal | 240 |
| Barley | 220 |
| Soy hulls | 232 |
| HC plus Premix (specific mineral pre-mix) | 25 |
| Herring fish oil | 20 |
| Hiboot salt | 10 |
| Vitamin E | 5 |
| Mag Ox | 4 |
| Vitamin ADE | 2 |
| Apple flavour | 2 |

Natural ingredients (coating material) comprising magnesium silicate hydroxide (talc) and/or sodium bentonite and/or combinations of clay are added at a concentration of about 3 to 8% w/w to the omega 3 feed ingredients/diet (i.e. 30 to 80 kg/1000 of the above feed ingredients). Other omega-3 fatty acid supplements comprising similar or different components may also be used for cattle, or other animals as would be known to a person of skill in the art. Further, the natural ingredient may be present in an amount outside the range described above, if desired.

In a further embodiment of the present invention, when the omega 3 fatty acid dietary supplement is used in goats, the supplement may be as follows:

|  | Kg. |
| --- | --- |
| Menhadden meal[1] | 240 |
| Herring meal | 240 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

| | |
|---|---|
| Barley | 140 |
| Soy hulls | 232 |
| Alfalfa or quackgrass brome grass | 40 |
| Kelp | 40 |
| HC plus Premix (specific mineral pre-mix) | 25 |
| Hiboot salt | 10 |
| Vitamin E | 5 |
| Mag Ox | 4 |
| Vitamin ADE | 2 |
| Apple flavour | 2 |

As described previously, a natural ingredient (coating material) containing 3 to 8% w/w (of 1–3 kg/day per goat) is also added. Further, as described previously, the compositions may comprise additional components or lack specific components. Further, as the amounts of the components may vary in the amounts described therein, for example, but not limited to by about 50% or less, preferably about 20% or less, more preferably about 5% or less.

In yet a further embodiment of the present invention, the natural ingredient (coating material) may also contain mixtures of omega-3 fatty acids. In a specific embodiment, the natural ingredient can be fortified with flax, for example, but not limited to in a ground meal and mixed or added to commercially available omega fatty acid supplements:

Magnesium silicate hydroxide (talc) and/or sodium bentonite and/or combinations of clay 3 to 8% w/w (of 3 kg/day of total supplement) plus 20–25% alpha linolenic acid (ALA) flax/algae/plant source (including DHA/EPA) or combinations of DHA/EPA microencapsulated fish oil (30EPA/20DHA) on a 3 to 8% w/w (of 3 kg/day of total supplement).

Flax powder may be prepared by any method known in the art, for example, but not limited to by a heat controlled process which removes the moisture without disrupting the cell wall, thus maintaining the omega 3 fatty acids and other essential fatty acids intact. The addition of the flax to the natural ingredient results in a product which is formable as a result of the stickiness of the overall product. Thus, this combination can be processed into a capsule or other product form, which results in a more easily handled product than when the clay or talc is used alone. The natural ingredient (coating material), which is fortified with flax can be used in combination with any of the commercially available omega 3 fatty acid dietary supplements which are described in more detail above.

Without wishing to be limiting, a total of 3.0 kg of omega 3 feed supplement may be used either as a top dressing or as part of a total mixed ration per day to each cow/beef cattle. Good results for cows were found by feeding a total of 1.5 kg of feed supplement at each of two milking times, i.e. morning and evening. The same amount per day is preferred for goats, however, the supplement mix for goats may be different than that from cows, as noted above.

In a further embodiment of the present invention, a flavouring ingredient may be added to the supplement to improve its palatability and taste to the animals. Once such flavouring compound, which can be added, is apple flavouring. However, many other such flavouring ingredients could also be chosen. Any flavoring agent or ingredient that is known in the art may be employed in the feed additive composition of the present invention.

A period of two to three weeks, or longer may be required before levels of omega-3 and omega-6 fatty acids are altered in animal products. Further, a similar period may be required for DHA to reach a minimum of 0.2% of the fat content (see below) or 6 mg/100 g based on a 3% level of fat in an animal.

Preferably, the feed comprises a high fiber content. Such feeds include but are not limited to hay, oats and corn silage as opposed to a high energy diet of wheat and barley. The use of hormones as milk promoters e.g. rumensen, Bst is not generally recommended, but may be used if desired.

As noted above, the feed and method of the present invention is particularly suited for ruminants, which include cattle, goats and sheep, but may be used in other animals as well. For example, chickens may also benefit from this feed supplement and added natural ingredient/coating mix. As noted previously, chickens benefit by having elevated long chain polyunsaturates (DHA) in the yolk of eggs and in the meat. Additional benefits may also include reduced infection and disease.

Animal products such as milk, meat and processed products e.g. cheese, produced by the method of the present invention exhibit enhanced levels of beneficial omega-3 and long chain polyunsaturates such as DHA/EPA. In this further embodiment, the production of elevated essential fatty acids and the maintenance of such essential fatty acids in pasturized milk and/or processed products, was not demonstrated in prior art studies, which used only a feed supplement containing omega fatty acid ingredients without the use of the natural ingredient/coating mix of the present invention. Although not wanting to be bound by any particular theory, it is believed that the essential fatty acids, which are produced for example in the milk or meat of animals fed according to the present invention, are associated with the natural fat in the milk and meat which remains stable, even though the products may be subjected to high temperature, for example, pasteurization or natural cooking. Pasteurization of milk usually follows a process of heating the milk to about 62.8° C. for half an hour or to about 72.8° C. for 15 seconds. This pasturized milk is usually stable, with refrigeration, for about 15 days. Ultra-pasteurization occurs at much higher temperature for a brief period of time. For example, normally ultra-pasteurization of milk occurs at about 141° C. for 1 to 2 seconds. Such milk is stable for approximately 60 days with refrigeration. This ultra-pasteurization process is also used in the production of ultra high temperature products, which are normally vacuum packed and can be stored for up to 90 days, without refrigeration. According to the present invention, the milk products pasteurized, as defined above, contain improved levels of the essential fatty acids. Similarly, meat processed temperatures as high as 230° C., or even higher, for 1 to 8 hours again maintain the elevated levels of essential fatty acids. In both cases, the fatty acids do not appear to be broken down during the processing stages and are thus stable in the milk and meat products.

The invention provides a number of benefits, including:

The production of elevated long chain polyunsaturates such as DHA/EPA naturally in the milk and dairy/food products such as cheese via the feed supplement and process that is palatable to livestock (e.g. cows, beef cattle, goats, poultry, horses, pets, etc.) and allows for elevated levels and/or improved ratios of nutraceutical components such as omega 3 fatty acids and long chain polyunsaturates (LCP's) to occur in such animal and food products including livestock that have a rumen e.g. cows and beef cattle;

The production of palatable and effective feed supplements for livestock that result in elevated amounts of omega 3 fatty acids and LPC's naturally in food products, ingredients and supplements;

The production of omega 3 fatty acids from plants either as fresh living plants and or as stabilized plant powder form as omega rich concentrates that can be used metabolically as feed/food ingredients alone or in combination with livestock fish meal/DHA/EPA marine or algae livestock supplements described herein;

The feed supplements provide health benefits to livestock, animals, etc. over standard diets including the production of healthier calves, shorter "dry periods" and general overall lengthening of "livestock life periods";

The production of fresh or powdered plant products with elevated amounts of omega 3 fatty acids that can be used as stable ingredients to animal feed or human food without causing odour, taint or taste, stability or quality problems.

The farms on which the research was conducted to support this invention showed that the dairy cows fed the omega 3 rich feed supplement in a recommended feeding regime appeared healthier than cows on standard diets.

Moreover, the production of milk either in volume per cow or quality has remained the same or been enhanced. The milk produced from such farms has shown exceptional "cheese production characteristics" e.g. whiteness, ability to form excellent curds, unique taste, etc.

In an alternate embodiment, which is not meant to be considered limiting in any manner, the present invention invention provides a feed or feed supplement combined with a ruminant diet of omega-3 plant source material which increases the amount of poly unsaturated fatty acids (PUFA'S) and increases the ratio of essential omega 3 fatty acids to omega 6 fatty acids in animal products such as, but not limited to milk, and other processed dairy by-products from animals including, but not limited to dairy cattle, beef cattle, chickens, goats, sheep, geese, pigs, ducks, etc. The present invention also pertains to the use of a feed supplement and to methods for modulating total polyunsaturated fatty acids and ratios of omega-3/omega-6 fatty acids in animal products.

In an embodiment of the present invention there is provided a feed or feed supplement in combination with an omega-3 plant source diet, for example, but not limited to grasses, and one or more natural ingredients that act as a rumen by pass ingredient, protecting the essential fatty acids from being broken down in the rumen thereby enabling the ruminant to receive/process the beneficial effects of the feed or food supplement formulations and the total intake of omega 3's in the diet of the animal.

Also, according to the present invention, there is provided a method of increasing the ratio of omega-3 fatty acids compared to omega-6 fatty acids in animal products such as milk by feeding the animals an omega 3 feed supplement and an omega 3 plant source from grasses or other plants. This may result in an increased ratio of omega 3 to omega-6 fatty acids in the animal's milk, as well as in other livestock by-products, including, but not limited to processed products used as food, feed, processed food products, supplements and ingredients. Ingestion or consumption of such products by other animals, such as, but not limited to humans may provide health benefits to the consumer.

Also encompassed by the present invention, a natural ingredient such as, but not limited to clay, talc or a mixture thereof may be fed to the animal alone prior to the animal consuming a feed supplement and plant source omega-3 diet, as described herein. Alternatively, the natural ingredient may be mixed with the omega 3 fatty acid feed supplement along with a plant source omega 3 diet, for example, but not limited to grasses, flax, brassica, and the like forming a part of the total diet of the ruminant.

As discussed previously, and again without wishing to be bound by theory, the natural ingredient as defined above may act as a rumin bypass ingredient and as an anti-acid in the livestock's stomach. Thus, the feed compositions of the present invention as defined herein may be employed as feed for a variety of animals. Further, the feed compositions of the present invention may be employed to increase both the concentration of essential fatty acids and ratios of omega 3 fatty acids to omega 6 fatty acids in milk and other animal products to less than about 1:1 to about 1:5 versus 1:7 or higher. In a further example the ratio of omega 3 fatty acids to omega 6 fatty acids in milk and other animal products is from about 1:1 to about 1:1.5.

The composition of the present invention may be used in livestock barns/feed lots and added to commercially available omega 3 feed supplements or as a total feed mix used along or in total mixed feed rations (TMR) to livestock.

In an embodiment, which is not meant to be considered limiting in any manner, about 90 to about 240 grams of the natural ingredient/coating mix (about 3–8% w/w) is added to about 3 kg of omega fatty acid feed supplement, either as a top dressing or as part of a total mixed ration. This recipe for an omega 3 feed supplement is combined with an omega 3 plant source ruminant diet comprising about 5 to 180 kg per day or more depending on the ruminant (size, type of animal and feeding/grazing needs).

The natural ingredient (coating material) may be pre-mixed into the omega 3 fatty acid feed supplement and/or with the omega-3 plant source. An example of the omega-3 fatty acid feed supplement according to the present invention, but which is not meant to be considered limiting in any manner is as follows:

|  | Kg. |
|---|---|
| Menhaden meal[1] | 150–300 |
| Herring meal | 150–300 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

[1] contains fish meal or oil from cold marine fish with a total DHA/EPA omega 3 and omega 6 content of the feed supplement being in the order of 400, 540, 600, 1000 mg/100 g respectively.

[2] contains 225 mg/g of EPA and 150 mg/g of DHA and 400 mg/g of omega 3 and 4 mg of omega 6's.

[3] contains 150 mg/g of omega 3 alpha linolenic acid or more

| Barley | 150–250 |
|---|---|
| Soy hulls | 170–250 |
| HC plus Premix (a specific premix) | 20–30 |
| Herring fish oil | 16–24 |
| HiBoot salt | 8–12 |
| Vitamin E | 4–6 |
| Mag Ox | 3.2–4.8 |
| Vitamin ADE | 1.6–2.4 |
| Apple flavour | 1.6–2.4 |

Natural ingredients such as magnesium silicate (talc) and/or sodium bentonite and/or combinations of clay are added to the above feed supplement at a concentration of about 3–20% (30 to 200 kg) with or without an omega-3 plant source, for example, but not limited to ground flax, sprouted flax, or the like. This feed supplement including the natural ingredient coating materials is fed to ruminants in the normal course of an omega 3 plant source diet e.g. cows grazing on grasses and plants.

A typical guaranteed analysis (total mix) for the feed supplement and coating material comprises:

| Crude protein (min) | 38.2% | Zinc (actual) | 185 mg/kg |
|---|---|---|---|
| *ECP from NPS (Max) | 0.0% | Manganese | 185 mg/kg |
| Crude fat (Min) | 6.1% | Copper | 75 mg/kg |
| Crude fiber (Max) | 11.0% | Iodine (actual) | 2.9 mg/kg |
| Calcium (Min) | 3.3% | Iron (Actual) | 500 mg/kg |
| Phosphorus (min) | 1.7% | Cobalt (Actual) | 0.85 mg/kg |
| Sodium (actual) | 0.76% | Fluorine | 100 mg/kg |
| Magnesium (actual) | 0.6% | Vitamin A (Min) | 23,300 IU/kg |
| Potassium (actual) | 0.8% | Vitamin D3 (min) | 5,060 IU/kg |
| Sulfur (actual) | 0.29% | Vitamin E (min) | 400 IU/kg |
| Omega 3 | 35.80 kg | Omega 6 | 13 g/kg |
| EPA | 17. g/kg | DHA | 38 g/kg |

As would be evident to a person of skill in the art, the feed supplement of the present invention may vary in any one or all of the components as shown above. Further, one or more of the components may be absent and other components not listed may be present in the feed supplement. In an embodiment of the present invention, the analysis for any one or all of the components may vary by about 20%, preferably less than 10%, more preferably less than 5% of the totals listed above.

In a further embodiment of the present invention, which is not meant to be limiting in any manner, the omega 3 feed supplement may be employed as feed for cattle:

|  | Kg |
|---|---|
| Menhaden meal[1] | 240 |
| Herring meal | 240 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

| Barley | 220 |
|---|---|
| Soy hulls | 232 |
| HC plus Premix (A specific mineral premix) | 25 |
| Herring fish oil | 20 |
| HiBoot salt | 10 |
| Vitamin E | 5 |
| Mag Ox | 4 |
| Vitamin ADE | 2 |
| Apple flavour | 2 |

Natural ingredients (coating materials) such as magnesium silicate (talc) and or sodium bentonite and/or combinations of clay are added to the above feed supplement at a concentration of about 3–20% (30 to 200 kg) with an omega 3 plant source, for example, but not limited to ground flax, sprouted flax or combination thereof. The feed supplement comprising the coating materials is fed to ruminants in the normal course of an omega 3 plant source diet e.g. cows grazing on grasses and plants.

In a further embodiment of the present invention, which is not meant to be limiting in any manner, the omega 3 fatty acid feed supplement may be used as feed for goats as follows:

|  | Kg |
|---|---|
| Menhaden meal[1] | 240 |
| Herring meal | 240 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

| Barley | 220 |
|---|---|
| Soy hulls | 232 |
| HC plus Premix (A specific mineral premix) | 25 |
| Herring fish oil | 20 |
| HiBoot salt | 10 |
| Vitamin E | 5 |
| Mag Ox | 4 |
| Vitamin ADE | 2 |
| Apple flavour | 2 |

A natural ingredient (coating material) comprising about 3–20% w/w of talc/clay or sodium bentonite may be added as described above.

The present invention also contemplates natural ingredients as defined above which are further fortified/mixed with omega-3 fish/algae and/or plant sources for example, but not limited to dried sprouted flax at about 1 to about 30% by weight compared to the natural ingredients. Thus, the present invention contemplates compositions comprising talc/clay and omega 3 plant sources, for example, but not limited to powders, mixed with the above omega 3 feed supplements.

The natural ingredient (coating material) may be employed in the compositions of the present invention as described herein in an amount of about 3 to 20% w/w (of a total 3–10 kg/day of supplement fed to cows). For example, but not wishing to be limiting in any manner, the natural ingredient may be mixed with about 10–30% (w/w) alpha linolenic acid (ALA) plant sourced material, for example, but not limited to dried sprouted flax seed and the like. Alternatively, algae sourced DHA/EPA in an amount of about 1 to 20% w/w basis (of the 3–10 kg/day of the supplement fed to cows) may be added to the natural ingredient of the present invention.

In embodiments of the invention wherein omega 3 plant sourced material such as, but not limited to dried sprouted flax seed is used, preferably it is prepared by a process which removes the moisture from the plant cell without disrupting the cell wall such as described in U.S. patent application No.

60/303/079 filed Jul. 7, 2001, which is herein incorporated by reference. However, any method of preparing omega-3 plant source material is contemplated by the present invention.

A total of about 3.0 to 10 kg of omega-3 feed supplement may be used as a top dressing or as part of a total mixed ration per day to each ruminant e.g. cow/beef cattle. However, amounts outside this range are also contemplated and may be used if desired. In an embodiment of the present invention, which is not meant to be limiting, lactating cows may be fed a total of about 1.5 kg/day/cow at each of two milking times (i.e. in the morning and evening.) In an alternate embodiment, the same amount per day may be employed for goats. However, as described previously, the total supplement mix for goats may be different than that for cows (see above). The total amount of omega 3 feed supplement fed per day to a ruminant may vary according to the amount of total omega 3 essential fatty acids targeted in the milk or processed animal product.

A total of about 4–6 weeks or more may be required before the levels of DHA/EPA, total omega-3's and ratio of omega-3 fatty acids to omega 6 fatty acids are altered in animal products. In a specific embodiment, dairy cows fed 3 kg/day of the omega 3 feed supplement (with coating materials) plus the feeding of grasses (e.g. omega 3 plant sources during grazing) produced milk comprising total omega 3 levels of about 50 mg/100 g of milk or more and omega 6 levels of about 68 mg/100 g of milk or less.

Preferably, a high fiber diet comprising plants such as, but not limited to hay, oats, and corn silage rather than a high energy diet containing grains such as wheat is employed as a feed source component in the present invention. The use of hormones as milk promoters for example rumensen and Bst are preferably not employed.

As noted above, the feed supplement and total feeding regime of the present invention is particularly suited to ruminants which include, but are not limited to dairy cows, beef cattle, goats, and the like. However, the feed supplement may be employed with other animals such as pigs, horses, chickens, geese, ducks and the like. Further, the feed supplements of the present invention may be employed to increase the total omega-3 fatty acids and the ratio of omega-3/omega-6 fatty acids in animal products.

The present invention may provide one or more benefits over other feed additive compositions and methods known in the art, for example, but not limited to:

The increased production of long chain polyunsaturates such as DHA/EPA above that naturally present in the milk and processed dairy products such as whole milk, cream, cheese, etc, via the use of a feeding regime that includes a feed or feed supplement comprising:
  a) essential fatty acids;
  b) a natural ingredient (coating material), for example, but not limited to talc, clay or combination thereof mixed with an omega 3 plant/or algae source, for example, but not limited to ground flax, dried sprouted flax or combination thereof;
  c) A plant food source such as, but not limited to grasses and the like which contain omega-3 fatty acids such as alpha linolenic acid; wherein the natural ingredient is present in the feed in an amount to increase the concentration of essential fatty acids (DHA/EPA) in the milk, and by-products of the animal (ruminant) fed with the feeding regime over a period of time.

Other benefits may include:

The production of palatable and effective feed supplements for livestock that result in elevated amounts of omega 3's and/or increased levels of omega 3 compared to omega 6 fatty acids in animal food products.

A feeding regime that provides increased health benefits to livestock and animals, over standard diets. Such health benefits may include, but are not limited to the production of healthier calves, less teat infections, shorter "dry periods" and general overall lengthening of livestock life periods. Further, the feeding regiment and feed additive compositions of the present invention may reduce the level of stress on the animals. For example, the feed supplements of the present invention may reduce stress in dairy cows resulting in uniform maintenance to milk production during periods of weather stress, for example, but not limited to during hot weather.

The feed additive compositions and methods described herein may also provide other benefits as would be understood by a person skilled in the art.

This invention will now be described with reference to specific examples, which are not to be construed as limiting.

EXAMPLES

Example 1

Increased Concentrations of Long Chain Fatty Acids in the Milk of Holstein Cattle Fed with the Omega Fatty Acid Dietary Supplement A total of 3 kg of omega fatty acid feed supplement was fed and top dressed with the magnesium silicate hydroxide and/or sodium bentonite. A total of 3 kg of the omega fatty acid food supplement was fed per day, half of this ration being fed at each of the two milking times, i.e., morning and evening. In this example, 3% to 8% of the natural ingredient/coating mix was added to the omega fatty acid feed supplement at each feeding. In this embodiment of the present invention, the omega fatty acid dietary supplement is as follows:

|  | Kg |
|---|---|
| Menhadden meal | 240 |
| Herring meal | 240 |
| Barley | 220 |
| Soy hulls | 232 |
| HC plus Premix (specific mineral pre-mix) | 25 |
| Herring fish oil | 20 |
| Hiboot salt | 10 |
| Vitamin E | 5 |
| Mag Ox | 4 |
| Vitamin ADE | 2 |
| Apple flavour | 2 |

The milk test results for specific cows from a research herd are shown below in the following Tables 1 to 4.

TABLE 1

(4 weeks after feeding supplement) Holstein cows:

| | Mg/100 gm (Milk) | | | | | |
|---|---|---|---|---|---|---|
| | 0 day Herd #1 | 4 Weeks Herd #1 | 0 day Herd #2 | 4 weeks Herd #2 | 0 day Herd #1 | 4 weeks Herd #3 |
| EPA | 0.4 | 6.4 | 0.3 | 5.6 | 0.4 | 4.7 |
| DHA | 0.3 | 15.4 | 0.3 | 8.9 | 0.3 | 12.0 |

TABLE 1-continued (4 weeks after feeding supplement) Holstein cows:

| | Mg/100 gm (Milk) | | | | | |
|---|---|---|---|---|---|---|
| | 0 day Herd #1 | 4 Weeks Herd #1 | 0 day Herd #2 | 4 weeks Herd #2 | 0 day Herd #1 | 4 weeks Herd #3 |
| Omega 3 | 12.0 | 45.6 | 11.0 | 34.7 | 12.0 | 39.2 |
| Omega 6 | 82.8 | 22.8 | 80.0 | 80.3 | 83.0 | 90.4 |
| % DHA | 0.03 | 0.46 | 0.03 | 0.3 | 0.03 | 0.34 |
| % Fat | 3.2 | 3.3 | 3.2 | 2.07 | 3.2 | 3.4 |

TABLE 2

(2 months after feeding supplement) Holstein cows Holstein Cows.

| | Mg/100 gm (Milk) | | | | | |
|---|---|---|---|---|---|---|
| | 0 day Herd #1 | 60 days Herd #1 | 0 day Herd #2 | 60 days Herd #2 | 0 day Herd #3 | 60 days Herd #3 |
| EPA | 0.1 | 8.5 | 0.2 | 11.0 | 0.2 | 7.0 |
| DHA | 0.08 | 15.2 | 0.1 | 16.7 | 0.1 | 12.4 |
| Omega 3 | 10.0 | 52.8 | 10.0 | 67.2 | 10.0 | 51.2 |
| Omega 6 | 87.0 | 74.9 | 80.0 | 78.3 | 82.0 | 74.8 |
| % DHA | 0.01 | 0.5 | 0.01 | 0.5 | 0.01 | 0.4 |
| % Fat | 3.2 | 3.2 | 3.3 | 3.3 | 3.2 | 3.1 |

TABLE 3

(3 months after feeding supplement) Holstein Cows

| | Mg/100 gm (Milk) | | | | | |
|---|---|---|---|---|---|---|
| | 0 day Herd #1 | 90 days Herd #1 | 0 day Herd #2 | 90 days Herd #2 | 0 day Herd #3 | 90 days Herd #3 |
| EPA | 0.4 | 6.6 | 0.4 | 6.6 | 0.2 | 6.00 |
| DHA | 0.2 | 14.00 | 0.3 | 11.00 | 0.1 | 10.00 |
| Omega 3 | 12.0 | 39.00 | 12.0 | 38.00 | 10.0 | 35.41 |
| Omega 6 | 80.5 | 64.20 | 83.0 | 55.00 | 82.0 | 72.00 |

TABLE 4

(4 months after feeding supplement) Holstein Cows Holstein cows

| | Mg/100 gm (Milk) | | | | | |
|---|---|---|---|---|---|---|
| | 0 day Herd #1 | 120 days Herd #1 | 0 day Herd #2 | 120 days Herd #2 | 0 day Herd #3 | 120 days Herd #3 |
| EPA | 0.4 | 8.5 | 0.4 | 11.00 | 0.2 | 7.0 |
| DHA | 0.2 | 15.2 | 0.3 | 16.7 | 0.1 | 12.4 |
| Omega 3 | 11.0 | 52.8 | 12.0 | 67.2 | 10.0 | 51.2 |
| Omega 6 | 88.0 | 74.9 | 83.0 | 78.3 | 82.0 | 74.8 |
| % DHA | 0.02 | 0.5 | 0.03 | 0.5 | 0.01 | 0.4 |
| % Fat | 3.2 | 3.2 | 3.2 | 3.3 | 3.2 | 3.1 |

In all of the tables shown above, the concentration of the essential fatty acids at 0 day are the results with milk produced from cattle fed with conventional feed. In these trials, attempts were made to feed the cattle omega 3 supplement, however the cows refused to eat such a supplement due to the taste and smell of the omega 3 feed supplement. However, mixed with the natural ingredient/coating mix of the present invention, the cattle did eat the omega 3 feed supplement.

Example 2

Increased Concentrations of Long Chain Fatty Acids in the Milk of Goats Fed with the Omega Fatty Acid Dietary Supplement A total of 3 kg of omega fatty acid feed supplement was fed and top dressed with the magnesium silicate hydroxide and/or sodium bentonite. A total of 3 kg of the omega fatty acid food supplement was fed per day, half of this ration being fed at each of the two milking times, i.e., morning and evening. In this example, 3% to 8% of the natural ingredient/coating mix was added to the omega fatty feed supplement at each feeding. In this embodiment of the present invention, the omega fatty acid dietary supplement is as follows:

| | Kg. |
|---|---|
| Menhadden meal | 240 |
| Herring meal | 240 |

Or combinations of DHA/EPA microencapsulated Fish oil (30EPA/20DHA) or combinations of NutraSprout (trademark) flax/algae powder that maintain DHA/EPA Omega 3/6 levels the same as Menhadden and Herring meal.

| | |
|---|---|
| Barley | 140 |
| Soy hulls | 232 |
| Alfalfa or quackgrass brome grass | 40 |
| Kelp | 40 |
| HC plus Premix (specific mineral pre-mix) | 25 |
| Hiboot salt | 10 |
| Vitamin E | 5 |
| Mag Ox | 4 |
| Vitamin ADE | 2 |
| Apple flavour | 2 |

The milk test results for specific goats from a research herd are shown below in the following Table 5.

TABLE 5

Goat Milk Results (One month after feeding)

| | Mg/100 gm (Milk) | | | |
|---|---|---|---|---|
| | 0 day | Herd #1 | Herd #2 | Herd #3 |
| EPA | 1.08 | 3.18 | 3.75 | 3.7 |
| DHA | 0.43 | 5.05 | 6.27 | 6.3 |
| Omega 3 | 13.76 | 29.81 | 37.71 | 37.8 |
| Omega 6 | 73.85 | 64.28 | 67.87 | 67.9 |
| % DHA | 0.02 | 0.20 | 0.21 | 0.22 |
| % Fat | 2.5 | 2.67 | 2.93 | 2.94 |

Example 3

Levels of Long Chain Fatty Acids Found in Dairy Products Made From Fresh Milk From Dairy Cattle The milk obtained from the Holstein cows, in accordance with Example 1, was used to produce dairy products such as cheese, yogurt, ice cream, curds, and sour cream. These products also showed an enhanced level of the essential fatty acids, i.e., DHA/EPA. Fatty acid results from the seven different batches of cheese produced from milk from Example 1 is shown below in Table 6.

TABLE 6

Omega 3 enriched Cheese Results (after 2 month storage)

Mg/100 g (cheese)

|  | Cheese Lot #1 | Cheese Lot #2 | Cheese Lot #3 | Cheese Lot #4 | Cheese Lot #5 | Cheese Lot #6 | Cheese Lot #7 |
|---|---|---|---|---|---|---|---|
| EPA | 19.8 | 20.2 | 55.0 | 60.1 | 62.4 | 53.0 | 55.0 |
| DHA | 104.0 | 104.0 | 121.0 | 120.4 | 117.2 | 100.00 | 117.0 |
| Omega 3 | 351.0 | 381.0 | 506.0 | 500.00 | 511.0 | 490.0 | 525.0 |
| Omega 6 | 1570.0 | 1652.0 | 980.0 | 885.0 | 947.0 | 959.0 |  |
| % DHA | 0.40 | 0.40 | 0.40 | 0.40 | 0.40 | 0.36 | 0.38 |
| % Fat | 26.8 | 28.3 | 31.0 | 30.0 | 31.3 | 29.2 | 31.0 |
| CLA | 183.0 | 159.0 | 180.0 | 175.0 | 140.0 | 180.0 | 200 |

Controlled levels of beneficial omega 3 fatty acids normally occurring in either goat cheddar or dairy cheddar cheese is shown below in Table 7.

TABLE 7

Regular Cheeses (Non enriched)

|  | Goat Cheddar (white) | Medium Cheddar (cow) |
|---|---|---|
| EPA | 11.89 | 13.6 |
| DHA | 6.9 | 20.42 |
| Omega 3 | 192.0 | 233.60 |
| Omega 6 | 718.3 | 846.8 |
| % DHA | 0.04 | 0.07 |
| % Fat | 19.33 | 27.4 |

Example 4

Concentration of Essential Fatty Acids in Meat From Animals Fed with the Omega Fatty Acid Supplement In a further aspect of the present invention, the level of beneficial omega fatty acids was found to be increased in the meat from animals fed with the omega fatty acid dietary supplement according to the present invention.

Results from a number of different carcasses from animals fed for 8 weeks on the dietary supplement of the present invention, is shown below in Tables 8 and 9.

TABLE 8

Meat Results - Veal (8 weeks after feeding)

Mg/100 g

|  | Day 0 | Meat Sample #1 | Meat Sample #2 | Meat Sample #3 | Meat Sample #4 | Meat Sample #5 | Meat Sample #6 |
|---|---|---|---|---|---|---|---|
| EPA | 0 | 25.0 | 18.0 | 21.0 | 20.9 | 21.0 | 15.0 |
| DHA | 0.01 | 14.9 | 12.9 | 11.3 | 12.6 | 13.2 | 10.0 |
| Omega 3 | 0.14 | 84.0 | 82.0 | 67.1 | 65.0 | 66.4 | 54.4 |

TABLE 8-continued

Meat Results - Veal (8 weeks after feeding)

Mg/100 g

|  | Day 0 | Meat Sample #1 | Meat Sample #2 | Meat Sample #3 | Meat Sample #4 | Meat Sample #5 | Meat Sample #6 |
|---|---|---|---|---|---|---|---|
| Omega 6 | 260 | 269 | 72 | 59 | 200 | 201 | 200 |
| % DHA | 0 | 0.47 | 0.25 | 0.48 | 0.60 | 0.4 | 0.5 |
| % Fat | 3.4 | 3.4 | 5.6 | 2.3 | 2.1 | 3.0 | 2.0 |

TABLE 9

Meat Results - Beef (8 weeks after feeding)

Mg/100 g

|  | Day 0 | Meat Sample #1 | Meat Sample #2 | Meat Sample #3 |
|---|---|---|---|---|
| EPA | 0 | 21.0 | 21.2 | 16.3 |
| DHA | 0.01 | 14.0 | 14.6 | 14.2 |
| Omega 3 | 0.15 | 65.5 | 80.1 | 82.7 |
| Omega 6 | 200 | 204.0 | 290.0 | 338.0 |
| % DHA | 0 | 0.5 | 0.3 | 0.2 |
| % Fat | 4.0 | 2.7 | 5.0 | 8.3 |

Example 5

Concentration of Essential Fatty Acids in Eggs From Poultry Fed with the Omega Fatty Acid Supplement In a further embodiment of the present invention, it was found that hens fed with the dietary supplement of the present invention showed an increase concentration of omega 3 fatty acids in the resulting eggs. Rations fed to hens included total mix of 0.1 to 0.2 kg/day to general feed ration per hen. The coating used was 100–300 g of coating mix in 0.1 to 0.2 kg of sprouted (Nutraflax) powder.

The concentration of beneficial omega fatty acids resulting in eggs from poultry after three weeks of feeding with the omega fatty acid dietary supplement of the present invention. These results are shown below in Table 10.

TABLE 10

Poultry Results (eggs three weeks after feeding)

Mg/100 g (Hens)

|  | Day 0 | Sample #1 | Sample #2 | Sample #3 | Sample #4 | Sample #5 |
|---|---|---|---|---|---|---|
| EPA |  | 4.0 | 4.0 | 5.0 | 4.4 | 4.6 |
| DHA |  | 115 | 112 | 116 | 113 | 120 |
| Omega 3 |  | 180 | 185 | 174 | 178.3 | 180 |
| Omega 6 |  | 1184 | 1356 | 1137 | 1291 | 1300 |
| % DHA | 0.08 | 1.22 | 1.02 | 1.27 | 1.14 | 1.20 |
| % Fat | 9.3 | 9.41 | 10.26 | 9.22 | 9.92 | 9.24 |

Example 6

Essential Fatty Acids Stable in Processed Milk Products Following Heat Treatment The milk products produced according to the present invention, for example, milk or cheese, were further processed which demonstrates the stability of the essential fatty acids contained in the enriched milk of the present invention. For example, milk produced from Holstein cattle fed with the feed supplement of the present invention, was pasteurized and the concentration of essential fatty acids retested. These results are shown below in Table 11, which shows that the essential fatty acids were stable, even following pasteurization treatment.

TABLE 11

Milk, Pasteurized Milk mg/100 g (milk)

|  | Sample #1 | Sample #2 | Sample #3 | Sample #4 | Sample #5 | Sample #6 |
|---|---|---|---|---|---|---|
| EPA | 10.0 | 8.2 | 6.6 | 6.2 | 8.4 | 9.1 |
| DHA | 15.4 | 15.2 | 14.0 | 11.0 | 15.2 | 16.7 |
| Omega 3 | 67.2 | 52.7 | 39.0 | 38.0 | 67.0 | 36.3 |
| Omega 6 | 74.9 | 78.3 | 64.2 | 55.0 | 72.0 | 82.0 |
| % DHA | 0.5 | 0.5 | 0.4 | 0.3 | 0.5 | 0.5 |
| % Fat | 3.2 | 3.3 | 3.2 | 3.2 | 3.3 | 3.1 |

The cheese produced by the present invention, from Holstein cattle, fed with the feed supplement, was further processed by heating to produce a cheese melt. The cheese was heated at 230° C. for 1 to 2 minutes. Following this heat treatment, the cheese was retested for the concentration of the essential amino acids. These results can be found below in Table 12, where it is noted that the essential fatty acids are stable, despite the heat processing.

TABLE 12

Cheese Melted (Ultra Heat 230° C. for 1–2 minutes)

| mg/100 g | Cheese Lot #1 | Cheese Lot #2 | Cheese Lot #3 |
|---|---|---|---|
| EPA | 55.0 | 60.1 | 62.4 |
| DHA | 121 | 120.4 | 117.2 |
| Omega 3 | 506 | 500 | 511.0 |
| Omega 6 | 980 | 885.0 | 947.0 |
| % DHA | 0.4 | 0.4 | 0.40 |
| % Fat | 31.0 | 30.1 | 31.3 |
| CLA | 180 | 175.0 | 140.0 |

Example 7

Increased Concentrations of DHA/EPA in Whole Milk of Holstein Dairy Cows Fed Grass and an Omega 3 Feed Supplement (Including Coating Materials) Versus Dairy Cows Fed Only Grass A) Grass fed (pasture grazed cows) plus omega feed supplement fed to dairy cows (3.0 kg/day/cow of supplement) Amounts mg/100 g of whole milk (total average from 5 cows per farm)

| Dairy Farm # | Total Omega-3 | total omega-6 | DHA | EPA |
|---|---|---|---|---|
| 1 (3wks feeding) | 44.4 | 63.0 | 2.3 | 1.5 |
| 2 (3wks feeding) | 66.7 | 72.4 | 1.3 | 2.6 |
| Average | 55.6 | 67.7 | 1.8 | 2.1 |
| 1 (4wks feeding) | 42.4 | 49.4 | 3.64 | 1.89 |
| 2 (4wks feeding) | 50.6 | 51.3 | 4.36 | 2.64 |
| Average | 46.5 | 50.4 | 4.0 | 2.3 |
| 1 (6wks feeding) | 44.73 | 60.4 | 5.06 | 6.55 |
| 2 (6wks feeding) | 57.46 | 68.91 | 6.98 | 3.77 |
| Average | 51.1 | 64.5 | 6.02 | 5.2 |
| 1 (8wks feeding) | 63.1 | 63.0 | 5.82 | 3.52 |
| 2 (8wks feeding) | 84.0 | 70.0 | 8.16 | 4.66 |
| Average | 73.6 | 66.5 | 7.00 | 4.0 |

B) No Omega 3 supplement; only grass fed dairy cows. (composite sample from 40 cows per farm; same farms as above)

| Farm # | Mg/100 g of whole milk | | | |
|---|---|---|---|---|
| 1(Grazed only) | 63.5 | 77.7 | 3.94 | 1.38 |
| 2(grazed only) | 75.9 | 74.9 | 3.91 | 3.10 |
| Average | 69.7 | 76.3 | 3.9 | 2.24 |

Measurements were taken after 8 weeks feeding

The omega 3 feed supplement employed was as follows:

|  | Kg |
|---|---|
| Menhaden meal[1] | 240 |
| Herring meal | 240 |

Or combinations of DHA/EPA microencapsulated fish oil sourced DHA/EPA (e.g. 30EPA/20DHA)[2] or combinations of plant sourced omega 3's such as ground or dried sprouted flax[3], cucumber, brassica/algae powder that maintains stable levels of DHA/EPA or ALA in total omega 3/6 levels as menhaden and or herring meal.

|  |  |
|---|---|
| Barley | 220 |
| Soy hulls | 232 |
| HC plus Premix | 25 |
| (A specific mineral premix) |  |
| Herring fish oil | 20 |
| HiBoot salt | 10 |
| Vitamin E | 5 |
| Mag Ox | 4 |
| Vitamin ADE | 2 |
| Apple flavour | 2 |

Natural ingredients (coating materials) such as magnesium silicate (talc) and or sodium bentonite and/or combinations of clay are added to the above feed supplement at a concentration of about 3–20% (30 to 200 kg) with an omega 3 plant source, for example, but not limited to ground flax, sprouted flax or combination thereof. The feed supplement comprising the coating materials is fed to ruminants in the normal course of an omega 3 plant source diet e.g. cows grazing on grasses and plants.

A typical guaranteed analysis (total mix) for the omega-feed supplement comprising the coating material was as follows:

| | | | |
|---|---|---|---|
| Crude protein (min) | 38.2% | Zinc (actual) | 185 mg/kg |
| *ECP from NPS (Max) | 0.0% | Manganese | 185 mg/kg |
| Crude fat (Min) | 6.1% | Copper | 75 mg/kg |
| Crude fiber (Max) | 11.0% | Iodine (actual) | 2.9 mg/kg |
| Calcium (Min) | 3.3% | Iron (Actual) | 500 mg/kg |
| Phosphorus (min) | 1.7% | Cobalt (Actual) | 0.85 mg/kg |
| Sodium (actual) | 0.76% | Fluorine | 100 mg/kg |
| Magnesium (actual) | 0.6% | Vitamin A (Min) | 23,300 IU/kg |
| Potassium (actual) | 0.8% | Vitamin D3 (min) | 5,060 IU/kg |
| Sulfur (actual) | 0.29% | Vitamin E (min) | 400 IU/kg |
| Omega 3 | 35.80 kg | Omega 6 | 13 g/kg |
| EPA | 17. g/kg | DHA | 38 g/kg |

Example 8

Increased Concentrations of DHA/EPA and Increased Ratios of Omega 3/6 Fatty Acids in Whole Milk of Holstein Dairy Cows Grazing on Grass and Fed the Feed Supplement as Described Herein (Including Natural Ingredients (Coating Materials)) Versus Whole Milk Produced from Dairy Farm Operations Fed Only Silage (Corn/Soy/Hay)

A) Grass fed (pasture grazed cows) plus omega feed supplement fed to dairy cows (3.0 kg/day/cow of supplement)

Amounts mg/100 g of whole milk (total average from 5 cows per farm)

| | Mg/100 g of whole milk | | | |
|---|---|---|---|---|
| Dairy Farm # | Total Omega 3 | total omega 6 | DHA | EPA |
| 1 (3wks feeding) | 44.4 | 63.0 | 2.3 | 1.5 |
| 2 (3wks feeding) | 66.7 | 72.4 | 1.3 | 2.6 |
| Average | 55.6 | 67.7 | 1.8 | 2.1 |
| Omega 3/6 ratio | 1:1.2 | | | |
| 1 (4wks feeding) | 42.4 | 49.4 | 3.64 | 1.89 |
| 2 (4wks feeding) | 50.6 | 51.3 | 4.36 | 2.64 |
| Average | 46.5 | 50.4 | 4.0 | 2.3 |
| Omega 3/6 ratio | 1:1.1 | | | |
| 1 (6wks feeding) | 44.73 | 60.4 | 5.06 | 6.55 |
| 2 (6wks feeding) | 57.46 | 68.91 | 6.98 | 3.77 |
| Average | 51.1 | 64.5 | 6.02 | 5.2 |
| Omega 3/6 ratio | 1:1.3 | | | |
| 1 (8wks feeding) | 63.1 | 63.0 | 5.82 | 3.52 |
| 2 (8wks feeding) | 84.0 | 70.0 | 8.16 | 4.66 |
| Average | 73.6 | 66.5 | 7.00 | 4.0 |

Omega 3/6 ratio less than 1:1

B) Regular Silage fed cows (no omega 3 feed supplements)

Amounts mg/100 g of whole milk (composite from bulk tank samples)

| Sample/Farm: | Omega 3 | Omega 6 | DHA | EPA |
|---|---|---|---|---|
| 1 | 25.3 | 65.8 | 1.24 | 0.857 |
| 2 | 17.89 | 121.08 | 0.66 | 0.44 |
| 3 | 12.0 | 82.8 | 0.3 | 0.4 |
| 4 | 10.0 | 87.0 | 0.08 | 0.1 |
| 5 | 12.0 | 80.5 | 0.2 | 0.4 |
| 6 | 11.0 | 88.0 | 0.2 | 0.4 |
| Average | 14.7 | 75.53 | 0.44 | 0.43 |

Average Omega 3/6 ratio 1:5.1
Measurements were taken after 8 weeks feeding.

The feed supplement was as indicated in Example 7.

Example 9

Increased Concentrations of DHA/EPA and Increased Ratios of Omega 3/6 Fatty Acids in Whole Milk of Holstein Dairy Cows Fed Grass and the Omega 3 Feed Supplement as Described Herein (Including Coating Materials) Versus Whole Milk Produced From Dairy Farm Operations Fed Silage (Corn/Soy/Hay) Plus an Omega 3 Feed Supplement A) Grass fed (pasture grazed grass fed cows) plus omega feed supplement fed to dairy cows (3.0 kg/day/cow of supplement)

Amounts mg/100 g of whole milk (total average from 5 cows per farm)

| | Mg/100 g of whole milk | | | |
|---|---|---|---|---|
| Dairy Farm # | Total Omega 3 | total omega 6 | DHA | EPA |
| 1 (3 wks feeding) | 44.4 | 63.0 | 2.3 | 1.5 |
| 2 (3 wks feeding) | 66.7 | 72.4 | 1.3 | 2.6 |
| Average | 55.6 | 67.7 | 1.8 | 2.1 |
| Omega 3/6 ratio | 1:1.2 | | | |
| 1 (4 wks feeding) | 42.4 | 49.4 | 3.64 | 1.89 |
| 2 (4 wks feeding) | 50.6 | 51.3 | 4.36 | 2.64 |
| Average | 46.5 | 50.4 | 4.0 | 2.3 |
| Omega 3/6 ratio | 1:1.1 | | | |
| 1 (6 wks feeding) | 44.73 | 60.4 | 5.06 | 6.55 |
| 2 (6 wks feeding) | 57.46 | 68.91 | 6.98 | 3.77 |
| Average | 51.1 | 64.5 | 6.02 | 5.2 |
| Omega 3/6 ratio | 1:1.3 | | | |
| 1 (8 wks feeding) | 63.1 | 63.0 | 5.82 | 3.52 |
| 2 (8 wks feeding) | 84.0 | 70.0 | 8.16 | 4.66 |
| Average | 73.6 | 66.5 | 7.00 | 4.0 |

Omega 3/6 ratio less than 1:1

B) Four Weeks after feeding omega 3 supplement and regular silage (Holstein Cows)

(Composite of 3 Herds of 15 Cows Per Farm)

| | Mg/100 g of whole milk | | | |
|---|---|---|---|---|
| Farm No | Omega 3 | Omega 6 | DHA | EPA |
| 1 | 43.7 | 80.3 | 8.9 | 5.6 |
| 2 | 39.2 | 90.4 | 12.0 | 4.7 |
| Average | 41.45 | 85.35 | 10.45 | 5.15 |

Omega 3/6 ratio: 1:2

The feed supplement was as indicated in Example 7.

Example 10

Variations of Specific Feed Supplement Formulation

The following example is not meant to limit the invention in any manner. The feed/feed supplement may comprises the following wherein the essential fatty acid is selected from the group consisting of omega 3 fatty acid and omega 6 fatty acid.

|  | Kg. |
| --- | --- |
| Menhaden meal* | 150–300 |
| Herring meal | 150–300 |

Or combinations of DHA/EPA microencapsulated fish oil sourced DHA/EPA (e.g. 30EPA/20DHA) or combinations of plant sourced omega 3's such as ground or dried sprouted flax*, cucumber, brassica/algae powder that maintains stable levels of DHA/EPA or ALA in total omega 3/6 levels as menhaden and or herring meal.

*contains fish meal or oil from cold marine fish with a total DHA/EPA omega 3 and omega 6 content o the feed supplement being in the order of 400, 540, 600, 1000 mg/100 g respectively.

**contains 225 mg/g of EPA and 150 mg/g of DHA and 400 mg/g of omega 3 and 4 mg of omega $_6$'s.

***contains 150 mg/g of omega 3 alpha linolenic acid or more

| Barley | 150–250 |
| --- | --- |
| Soy hulls | 170–250 |
| HC plus Premix (a specific premix) | 20–30 |
| Herring fish oil | 16–24 |
| HiBoot salt | 8–12 |
| Vitamin E | 4–6 |
| Mag Ox | 3.2–4.8 |
| Vitamin ADE | 1.6–2.4 |
| Apple flavour | 1.6–2.4 |

Natural ingredients and/or the equivalent of coating magnesium silicate (talc) and or sodium benonite and or combinations of clay are added to the above feed supplement at a concentration of 3–20% (30 to 200 kg) with or without an omega 3 plant source e.g. ground flax or sprouted flax, and the like. This feed supplement plus the coating materials is fed to ruminants in the normal course of an omega 3 plant source diet e.g. cows grazing on grasses and plants.

Or

|  | Kg |
| --- | --- |
| Menhaden meal * | 240 |
| Herring meal | 240 |

Or combinations of DHA/EPA microencapsulated fish oil sourced DHA/EPA (e.g. 30EPA/20DHA) or combinations of plant sourced omega 3's such as ground or dried sprouted flax*, cucumber, brassica/algae powder that maintains stable levels of DHA/EPA or ALA in total omega 3/6 levels as menhaden and or herring meal.

| Barley | 220 |
| --- | --- |
| Soy hulls | 232 |
| HC plus Premix | 25 |
| (A specific mineral premix) |  |
| Herring fish oil | 20 |
| HiBoot salt | 10 |
| Vitamin E | 5 |
| Mag Ox | 4 |
| Vitamin ADE | 2 |
| Apple flavour | 2 |

Natural (ingredients) and or the equivalent of coating magnesium silicate (talc) and or sodium benonite and or combinations of clay are added to the above feed supplement at a concentration of 3–20% (30 to 200 kg) with an omega 3 plant source e.g. ground flax or sprouted flax, and the like. This feed supplement plus the coating materials is fed to ruminants in the normal course of an omega 3 plant source diet e.g. cows grazing on grasses and plants.

Or in the case of goats,

|  | Kg |
| --- | --- |
| Menhadden meal * | 240 |
| Herring meal | 240 |

Or combinations of DHA/EPA microencapsulated fish oil sourced DHA/EPA (e.g. 30EPA/20DHA) or combinations of plant sourced omega 3's such as ground or dried sprouted flax*, cucumber, brassica/algae powder that maintains stable levels of DHA/EPA or ALA in total omega 3/6 levels as menhaden and or herring meal.

| Barley | 140 |
| --- | --- |
| Soy hulls | 232 |
| Alfalfa or grass mixture | 40 |
| Kelp | 40 |
| HC plus Premix | 25 |
| (A specific mineral premix) |  |
| HiBoot salt | 10 |
| Vitamin E | 5 |
| Mag Ox | 4 |
| Vitamin ADE | 2 |
| Apple flavour | 2 |

Plus a coating mix containing 3–20% w/w of talc/clay or sodium bentonite.

All references referred to herein are incorporated by reference.

This invention will now be defined with respect to particular claims, which are not to be construed as limiting.

What is claimed is:

1. A livestock feed comprising: a) a feed supplement enriched with one or more of fatty acids selected from the group consisting of omega 3 fatty acids and omega 6 fatty acids; b) a natural ingredient selected from the group consisting of talc, clay and mixtures thereof capable of acting as a by-pass ingredient and c) a plant food source comprising omega 3 fatty acids, wherein said plant food source is selected from the group consisting of ground sprouted flax, dried sprouted flax, and mixtures thereof.

2. The feed of claim 1 wherein said one or more essential fatty acids of the feed supplement is omega 3 fatty acids from fish, plant or algae sources.

3. The feed of claim 2 wherein the feed further comprises a bulk mixture of fibrous animal feed and a livestock vitamin mixture; and wherein the feed supplement and plant food source are premixed with the natural ingredient before the fibrous animal feed and vitamin mixture is added.

4. The feed of claim 3 wherein the fibrous animal feed is selected from the group consisting of barley and soy hulls.

5. The feed of claim 2 wherein said feed supplement comprises omega 3 fatty acids selected from the group consisting of docosahexaenoic acid (DHA), eicosapentenoic acid (EPA) and alpha linolenic acid (ALA).

6. The feed according to claim 1 wherein said feed supplement, natural ingredient and plant food source are present in the feed in an amount to increase the total concentration of omega 3 fatty acids in an animal or to increase the ratio of omega 3 to omega 6 in the animal or product thereof, after said animal is fed the feed.

7. The feed according to claim 5, wherein the ratio of omega 3 to omega 6 in the animal or product thereof, after said animal is fed said feed is in the range of about 1:1 to about 1:1.5.

8. The feed of claim 2 wherein said feed supplement comprises fatty acids selected from the group consisting of linoleic acid, conjugates of linolenic acid (CLA), and docosapentaenoic acid (DPA).

* * * * *